Jan. 26, 1965  C. R. TURNER  3,167,643
THERMAL WATTAGE CONTROLLER
Filed March 8, 1961  3 Sheets-Sheet 1

INVENTOR
CHARLES ROGER TURNER
BY Howson & Howson
ATTYS

Jan. 26, 1965  C. R. TURNER  3,167,643

THERMAL WATTAGE CONTROLLER

Filed March 8, 1961  3 Sheets-Sheet 2

INVENTOR:
CHARLES ROGER TURNER
BY Howson & Howson
ATTYS

Jan. 26, 1965  C. R. TURNER  3,167,643
THERMAL WATTAGE CONTROLLER
Filed March 8, 1961  3 Sheets-Sheet 3

INVENTOR:
CHARLES ROGER TURNER
BY Howson & Howson
ATTYS.

United States Patent Office 3,167,643
Patented Jan. 26, 1965

3,167,643
THERMAL WATTAGE CONTROLLER
Charles Roger Turner, Philadelphia, Pa., assignor, by mesne assignments, to King-Seeley Thermos Co., Ann Arbor, Mich., a corporation of Michigan
Filed Mar. 8, 1961, Ser. No. 94,227
26 Claims. (Cl. 219—511)

This invention relates to thermal wattage controllers used for controlling an electric heating load such as the surface heating unit of an electric range. More particularly the invention relates to improvements in the so-called "infinite switch" which has an infinite number of control positions through a given range of temperatures.

Infinite switches may assume a variety of forms but, characteristically, they include two features. They provide means to adjustably resiliently displace one contact by the other in the closed position. They have a thermomotive member arranged to open the contacts in response to heat from a low wattage resistance heater connected in series with the contacts. The extent of the displacement of one contact by the other, as set by the adjustment means, is commonly referred to as the amount of contact overclosure. Due to its series arrangement the resistance heater is intermittently deenergized as contacts part and reenergized as cooling causes the thermomotive member to reclose the contacts. The ratio of on to off time of a heating load in series with the contacts, and therefore the total energy delivered to the heating load, is in this way determined by the amount of overclosure of the switch contacts.

Switches of this type have not only the advantage of complete flexibility in heat adjustment, but also the important advantage of being self-compensating for variations in the supply voltage; i.e., the effective rate of energization of the heating unit remains constant despite changes in the impressed voltage. For these reasons their use has increased rapidly in the United States and elsewhere despite their characteristic tendency to be difficult to calibrate precisely in the lowest input settings. This tendency is due to the fact that the amount of contact overclosure required for low inputs, such as are used for warming and simmering in electric cooking, is so small as to be significantly affected by contact wear and other mechanical variations. The present invention provides an infinite switch having improved accuracy in the lower input range.

When using the inputs necessary for simmering with the low-mass high-wattage surface units now commonly furnished for electric ranges, it is sometimes observed that the cooking rate fluctuates as the electric current is cycled on and off by the infinite switch. This is caused by excessively long on-off cycles, which are, in turn, due to the fact that in infinite switches of the prior art the control bimetal operates at a very low temperature at the low input settings and therefore has a very low cooling rate. This invention provides an infinite switch having more nearly uniform cycle lengths in the lower input settings without sacrificing optimum performance in the higher input range.

The above objects are accomplished, in accordance with the present invention, by providing means for synchronously increasing the heat effect of the resistance heater associated with the bimetal as lower inputs are selected. With a conventional infinite switch, despite the fact that the overall heating effect is varied by the amount of time the heater element is energized, the instantaneous heat effect per unit of time is essentially constant during the portion of the time in which the contacts are in closed position. In accordance with this invention this effect is modified either by increasing the resistance of the heater element or by increasing the current through the heater element as the time during which it is energized is decreased. In the former case heating increases in proportion to the increase in resistance. In the latter case heating increases in proportion to the square of the increase in current. As a result of these changes a correspondingly greater contact overclosure is required to produce a given percentage input, and the bimetal operates at comparatively high temperatures, even at input settings as low as 2 or 3% of maximum energy output at the heating load. For example, the operating temperature at a 2% setting may be made to approximate the temperature occurring at a 10% input setting on switches of the prior art. By proper selection of the means for varying the heat effect, the temperature-deflection characteristics of the bimetal, and the program adjustment of the heat selector cam, the control can be arranged to provide substantially uniform cycle lengths throughout a lower range of heat adjustments or even any desirable variation therefrom which may be needed to produce optimum performance characteristics for a given heating unit. In addition, such a provision reduces the criticality of the switch contacts from the standpoint of variation of input settings, expressed as percentage of on-time, by a factor of 4 or 5 times. That is to say, a mechanical deviation at the contacts, which would normally result in a change in percentage of on-time from 2% to 7% (a difference of 5%) can be made to result in merely a change of from 2% to 3% (a difference of only 1%). As a consequence, initial calibration is facilitated, and there is also less change in actual input for a given setting throughout the life of the control.

The invention may be understood by reference to the accompanying drawings illustrating certain embodiments, wherein.

Figure 1:
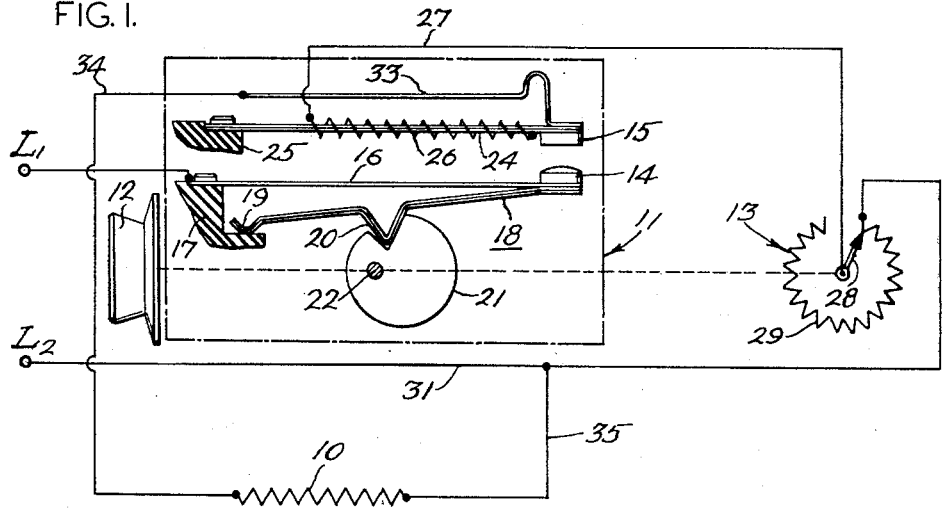
FIG. 1 is a schematic circuit diagram with associated mechanical parts, showing one embodiment of the invention.

Referring to FIG. 1, power is supplied from terminals L1 and L2 to a heating unit 10 through a switch unit generally designated 11, shown enclosed within a dashed line. Switch 11 is an infinite switch, preferably of the type illustrated and described in U.S. Patent No. 2,623,137, issued December 23, 1952, to W. H. Vogelsberg. In the construction shown, contact 14 is supported at one end of a current-carrying spring strip 16 which is mechanically attached at its other end to a portion of an insulating housing 17 within which the switch is preferably enclosed. Also connected to spring strip 16 adjacent contact 14 is a compensating bimetallic member 18 which has a free end 19 adapted to rest against a shoulder on a portion of the housing 17. Intermediate its ends, member 18 includes a V-shaped portion 20 providing a cam follower which is adapted to cooperate with cam 21. Cam 21 is affixed to shaft 22 and may be rotated by means of knob 12, attached to one end of that shaft. The active surface of cam 21, in the position shown, is cut away to permit the cam follower, under the urging of spring strip 16, to move contact 14 away from and out of engagement with contact 15. In other positions of the cam, contact 14 is urged into engagement with contact 15 and tends resiliently to displace contact 15 a progressively greater amount from the open contact position shown the farther the cam is turned in a clockwise direction from the "off" position, up to approximately 360°.

Contact 15 is supported at one end of bimetallic blade 24 whose other end is suitably attached to another portion 25 of housing 17. Blade 24 is sufficiently flexible to permit contact 15 to yield under pressure from contact 14, and the bimetal is oriented in such manner that when heated it tends to move contact 15 away from contact 14. The time required to separate contact 15 from contact 14 depends upon the amount of overclosure of the contacts, as determined by the amount of rotation of cam 21. Mechanically connected to blade 24, but insulated therefrom, is a current-carrying strut 33 which serves as a resistance heater. There is also provided an auxiliary resistance heater 26 in heat-transfer relationship with blade 24.

Preferably mounted on housing 17 is a potentiometer 13 whose movable wiper contact 28 is affixed to shaft 22 so that the position of the wiper is adjusted in relation to its fixed resistance winding 29 for each change in adjustment by knob 12 of the position of cam 21.

When shaft 22 turns cam 21 to any "on" position, power is supplied to heating unit 10 from terminal L1, through strip 16, contacts 14, 15, strut 33, connector 34, heating unit 10, and connectors 35 and 31 to terminal L2. Simultaneously connection is made from terminal L1 through strip 16, contacts 14, 15, resistance heater 26, connector 27, wiper 28, resistance winding 29 and connector 31 to terminal L2. The relation of wiper 28 to resistance winding 29 is such that, when cam 21 is turned in a clockwise direction only far enough to cause a minimum of overclosure of the contacts, to represent the lowest desired input, wiper 28 will be in a position in which little or none of the resistance winding is in circuit with resistance heater 26, whereby there s substantially full voltage across the resistance heater, which therefore provides maximum heat effect to bimetallic blade 24. As the cam is rotated to positions of greater overclosure, simultaneous rotation of the wiper moves it to positions in which a progressively greater amount of resistance is in circuit with resistance heater 26.

In operation, a setting of cam 21 by adjustment of knob 12 determines the ratio of on to off time of the heating unit 10 by the amount of overclosure of contact 14 against contact 15. Once the contacts are closed, current will flow not only through the heating unit, but also through heater strut 33 and auxiliary heater 26. The combination of heat derived from these elements will cause bimetallic blade 24 to flex, tending to separate contact 15 from contact 14 and open the circuit both to the heating unit 10 and to the members tending to heat blade 24. Upon opening of these circuits, blade 24 will cool and contacts 15 and 14 will again close, whereby the cycle is repeated. Since the amount of heat derived from auxiliary heater 26 depends on the angular position of cam shaft 22 to produce a certain amount of contact overclosure, as described above, the heat effect is synchronously increased as lower heats are selected, and more uniform cycle lengths are made possible throughout the lower range of heat adjustments.

Figure 2:
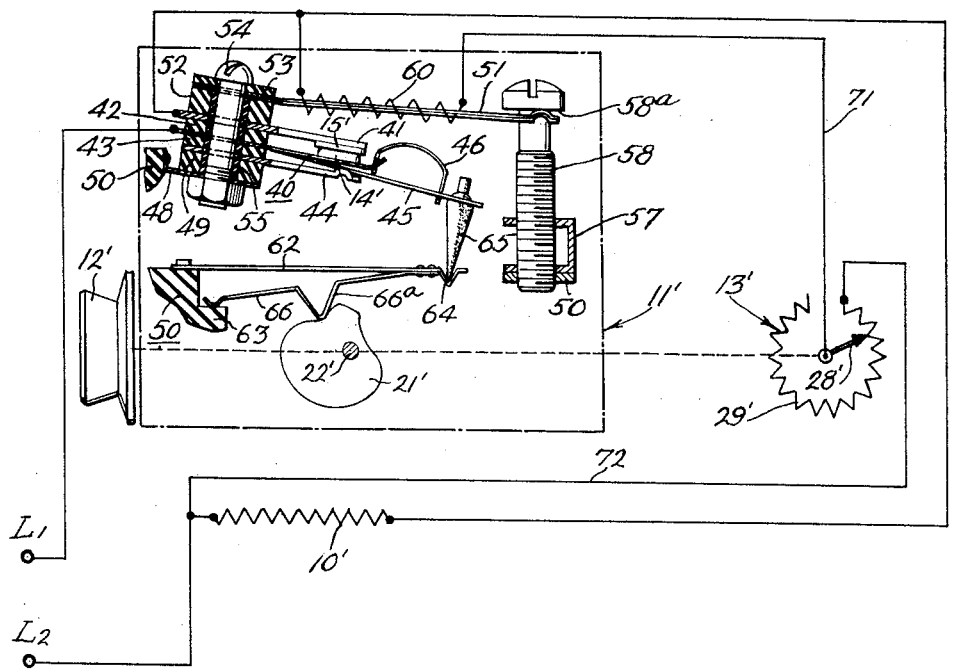
FIG. 2 is a similar schematic diagram showing a modified switch arrangement.

As described in aforementioned Patent No. 2,623,137, the association of strut 33 with bimetallic blade 24 is such that successive heating and cooling of the strut by the intermittent closing and opening of the contacts serves to augment such closing and opening since successive expansion and contraction of the strut provides a force opposed to the motion of the more active bimetal. This provision has been particularly beneficial in controls of the prior art in avoiding excessively long cycle lengths in the lowest temperature range. Since the present invention provides excellent contact action and more uniform cycle lengths, the use of the heated strut is of less importance, permitting an arrangement as shown in FIG. 2, which omits the strut and provides a snap-action switch. In this embodiment, similarly to FIG. 1, heating unit 10' is controlled by a switch unit, generally designated 11', by adjustment of knob 12', which simultaneously adjusts a cam 21' and a potentiometer 13'. In this case, however, switch contacts 14' and 15' are not directly supported by the temperature selecting means and the thermomotive means. Instead, contact 14' is supported on a spring blade 40 and contact 15' is supported on a relatively rigid blade 41. Blades 40 and 41, which are electrical conductors, are separated by insulator 42. A similar insulator 43 separates blade 40 from blade 44, the latter being provided to limit the movement of a secondary blade 45 which is supported together with spring blade 40. A bow spring 46 interconnects the ends of blades 40 and 45 to form an over-center type mechanism. The whole contact-supporting assembly is attached to a flexible member 48 which is separated from member 44 by an insulating bushing 49. Member 48 is connected to a portion of the housing 50. Completing the assembly is bimetallic member 51 supported between insulators 52 and 53, with insulator 52 separating member 51 and blade 41. Members 40, 41, 44 and 51, together with the separating insulating bushings are coupled together by a nut and bolt assembly 54, or similar means, and the bolt is insulated from all of the metallic members by an insulating sleeve 55. Fixed to another portion of the housing 50 is a bracket 57 which is threaded to accommodate a screw 58, the head of which provides a shoulder 58a against which the end of member 51 rests.

Bimetallic member 51 is heated by an associated auxiliary resistance heater 60 which is electrically insulated from the member. The high expansion side of the bimetal is oriented in such manner that its free end presses upward against shoulder 58a. Since this shoulder restrains movement in that direction the bimetal will tend to bow downward and thereby cause a clockwise rotation of the whole assembly about flexible support member 48.

One end of the flexible blade 62 is supported on another portion 63 of the housing 50. The other end of the blade is provided with an embossed socket portion 64. The tapered end of a conical insulator 65 affixed at its other end to blade 45 is fitted into the embossed socket portion 64 to provide a point-contact effect. Strut 66 is connected to blade 62 adjacent one end and engages a shoulder on housing portion 63 at its other end. Intermediate the ends of strut 66 is a V-shaped bend 66a providing a cam follower which is held in engagement with cam 21' by the resiliency of blade 62. Cam 21' is mounted on shaft 22' on which is also mounted potentiometer wiper 28'.

The switch of FIG. 2 is shown in the "on" position. The active surface of the cam is so shaped that a clockwise rotation of shaft 22', by means of knob 12', permits blade 62 to move progressively downward and the bias of blade 45 causes it to move downward correspondingly, resulting in an increasing overclosure of contact 14' against contact 15' through the cooperation of bow spring 46 and blade 40. The energizing circuit may be traced from terminal L1 to blade 40, contacts 14', 15', blade 41, and heating unit 10' to terminal L2. The auxiliary heater 60 is simultaneously energized by current which flows along the same path to blade 41, then branches through heater 60, connector 71, wiper 28', resistance winding 29', and connector 72 to terminal L2. Heat from heater 60 causes a bowing of bimetallic member 51 and results in a clockwise rotation of the whole contact-supporting assembly about flexible support member 48, as previously described. When this rotation causes blade 40 to pass blade 45, spring 46 opens the contacts with a snap action. This permits member 51 to cool, and the assembly then rotates counterclockwise until the members pass over center and the contacts snap closed.

The correlation between the cam adjustment and the amount of resistance put in series with the auxiliary heater 60 affects the cycle length in the same manner as described in relation to FIG. 1. Similar results can be accomplished to a significant extent by omitting the potentiometer and by using a resistance material for the auxiliary heater having a high positive thermal coefficient of resistance so that, as the operating temperature of the heater is reduced at the lower heat settings due to its being energized a small proportion of the time, its resistance is increased, thus resulting in an increase in its rate of energization and consequently in its heating output. A heater having a positive thermal coefficient of resistance may also be combined with the use of a potentiometer as herein described.

Numerous other modifications of the structure arranged to vary the instantaneous heat effect of the resistance heater may be envisioned. For example, this may be simply accomplished by providing means in conjunction with the cam control to move the resistance heater toward or away from the bimetal; a shield may be moved between the bimetal and the heater to alter the heat effect; a reflector may be moved to positions in which it will increase or reduce the heat effect; heat may be drained off by the use of a movable heat-absorbing member; or heat may be dissipated by varying the opening of air louvres in the housing.

Figure 3:
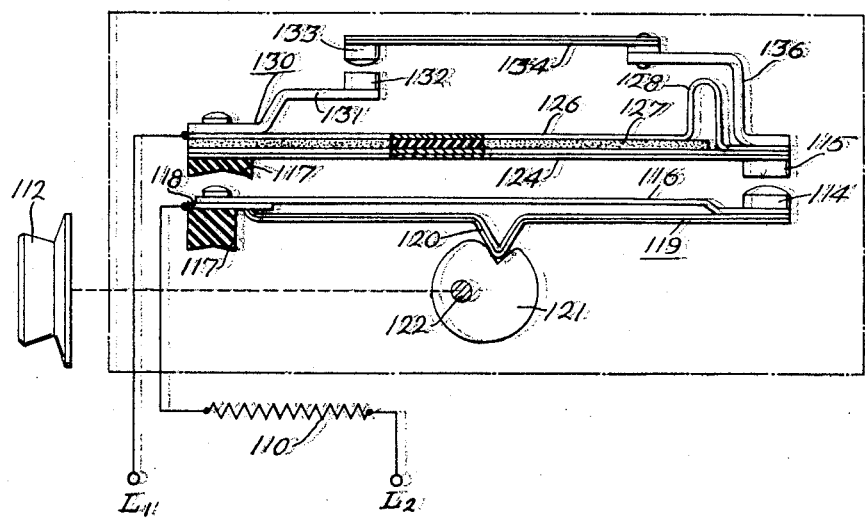
FIG. 3 is a similar schematic diagram showing a still different switch arrangement with the main switch contacts in inoperative position.
Figure 4:
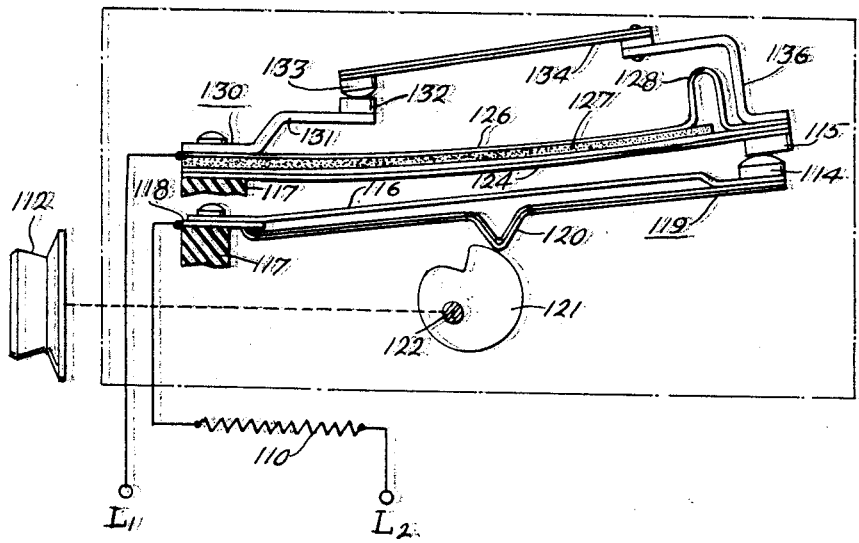
FIG. 4 shows the system of FIG. 3 with the main contacts closed and the second switch contacts closed.
Figure 5:
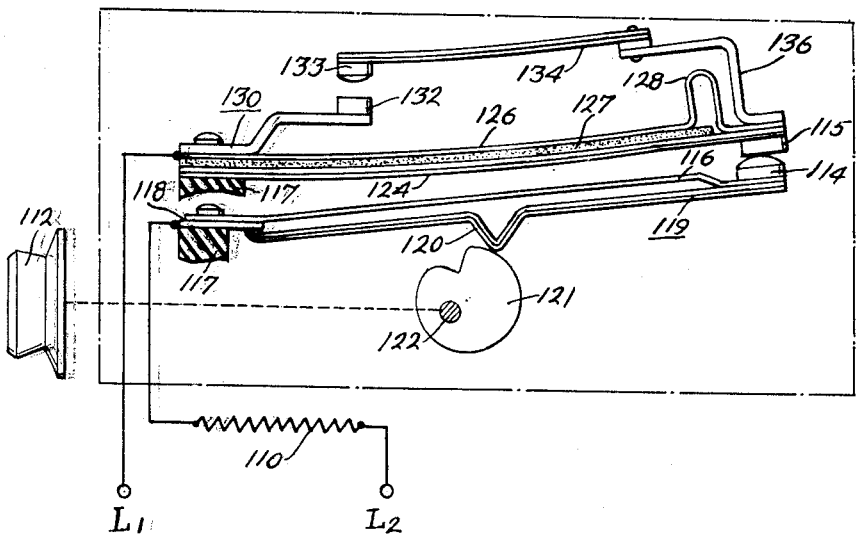
FIG. 5 shows the system of FIG. 3 with the second switch contacts open.

FIGS. 3–5 show an alternate and preferred embodiment of the invention. Similarly to FIG. 1, contact 114 is supported at one end of a current-carrying spring strip 116 whose other end is attached to plate 118 which in turn is affixed to the housing 117. Attached to blade 116 adjacent contact 114 is a compensating bimetallic member 119, including a V-shaped cam follower portion 120. The free end of bimetallic member 119 is curved to bear against the face of plate 118. Cam 121 is affixed to shaft 122 and may be rotated by means of knob 112. The active face of cam 121 engages cam follower 120 and is so shaped that clockwise rotation moves it from the "off" position illustrated in FIG. 3 to positions in which it brings contact 114 into engagement with opposing contact 115, as shown in FIGS. 4 and 5, and tends resiliently to displace contact 115 a progressively greater amount, the farther the cam is turned.

Contact 115 is affixed to one end of main bimetallic member 124 which is oriented in such manner that it tends to move upward when heated, thereby causing contact 115 to separate from contact 114. Bound together in heat-transfer relationship with member 124 is a current-carrying strip 126, which serves as a resistance heater. These parts are separated by an electrical insulating member 127. One end of strip 126 is provided with a spring loop 128 which is affixed to the contact-carrying end of member 124. The other ends of member 124 and strip 126 are suitably attached to a portion of the housing 117. Also connected to the housing by the same mechanical connecting means is a support member 130 having a portion 131 extending substantially parallel with strip 126 and carrying a contact 132 on its free end. The opposing contact 133 is affixed to the free end of an auxiliary bimetallic blade 134, whose other end is suitably attached to a second support member 136 which in turn is supported by the contact carrying end of member 124. Member 136, strip 126, member 124 and contact 115 are fixed together as by welding.

Blade 134 is arranged to be heated by current flowing through it and the bimetal is oriented in such manner that it tends to move contact 133 out of engagement with contact 132 when heated as shown in FIG. 5.

As shown, one side of the line is connected through heating unit 110 to plate 118. The other side of the line is connected to both the heater strip 126 and to support member 130. By this means contacts 132, 133 are in a shunt circuit around the heater strip. These contacts are so arranged as to be slightly separated when contacts 114, 115 are open and to be closed with progressively increasing displacement as contact 114 displaces contact 115 an increasing amount, this displacement resulting from the upward flexing of member 124 under the influence of the cam adjustment.

In operation, when cam 122 is turned to any "on" position, such as shown in FIG. 4, current flows from terminal L2 through heating unit 110, plate 118, blade 116 and contacts 114, 115. It then divides, a portion flowing through heater strip 126 and a portion through support 136, bimetallic blade 134, contacts 133, 132, and support 130 to terminal L1. Current flowing through bimetallic blade 134 heats it, because of its internal resistance, and this results in an eventual separation of contacts 132, 133 as shown in FIG. 5. When this occurs, the full current then flows through heater strip 126. Subsequent cooling of blade 134 results in a reclosing of contacts 132, 133, to the position of FIG. 4 and the ratio of closed to open time will depend on the amount of displacement of these contacts, which in turn depends on the amount of displacement of contacts 114 and 115. When the adjusting knob 112 is set for a low input, contacts 132, 133 are in open position a large portion of the time and a maximum amount of heat effect upon bimetallic member 124 is created by the flow of current through heater strip 126. As the control is set for progressively higher input rates, resulting in a progressively greater displacement of contact 132 by contact 133, the bypass around heater strip 126 is in service a greater proportion of the time, thereby reducing the heat effect on member 124. This is exactly the condition desired to tend to reduce the cycle length throughout the lower range of input adjustment, and to provide a substantial heat effect on bimetallic member 124 in the lowest input settings.

Figure 6:
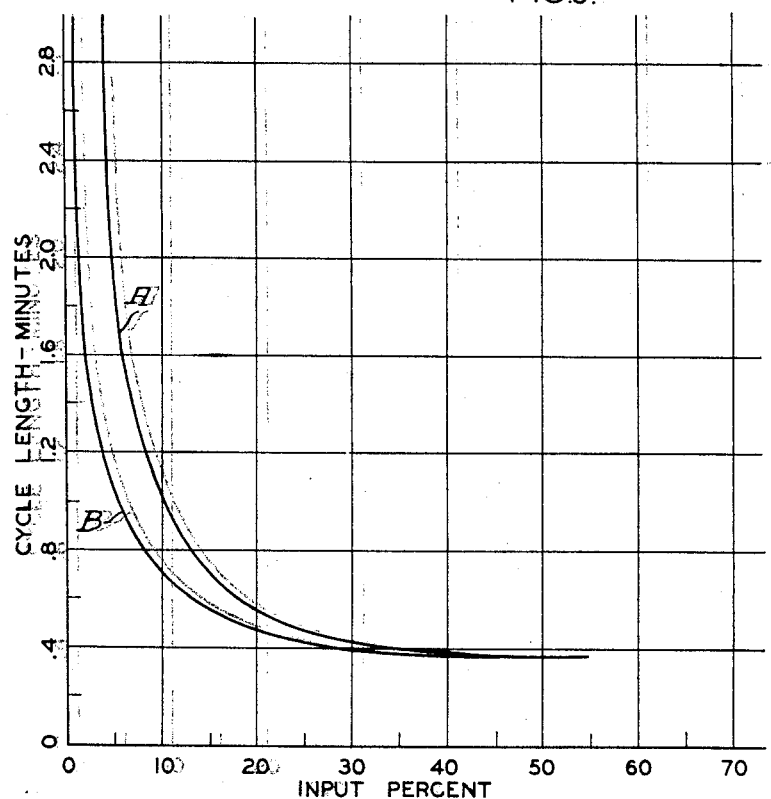
FIG. 6 is a graph illustrating the principle of the invention.

FIG. 6 illustrates the beneficial results that may be obtained by the practice of the invention. Curve A represents the characteristic ratio of cycle length to percentage input obtained by the use of an infinite switch constructed in accordance with the teachings of the prior art. Curve B represents the ratios obtained by one embodiment of a switch constructed in accordance with FIG. 3.

It will be seen that these curves are identical at inputs of approximately 45% and above, since contacts 132, 133 of FIG. 3 are continuously closed throughout that range. As the control is moved toward lower inputs, contacts 132, 133 begin to cycle on and off and as a consequence Curve B begins to diverge from Curve A. At a 5% input setting Curve A shows a cycle length of approximately 2.15 minutes, while Curve B indicates a cycle length of 1.02 minutes, a ratio of 2.11 to 1. This ratio increases as still lower inputs are selected.

Because of the higher heat effect in the lower ranges the new infinite switch provides reliable operation at inputs of 2% or even below whereas an infinite switch of the prior art is not dependable at such setting.

The invention shows another striking improvement over previous switches of this kind, which has to do with what may be termed the "cooling time." When an infinite switch is provided, the user frequently finds it advantageous to start with an initially high input in order to approach rapidly the desired cooking temperature, and then to adjust to a lower input to maintain that temperature. When this shift in setting is made, the contacts open and the heating unit is not again energized until the bimetal cools sufficiently to reclose the contacts at their new setting. During this elapse of time, the contents of the cooking vessel may also cool to a certain extent. Since the bimetal of the present invention is arranged to operate at a higher temperature at the low input settings than is the case with prior controls, there is a lesser elapse of time before the contacts reclose when adjusting from high to low input rates. This permits less cooling of the contents of the cooking vessel and provides much more stable operation. This effect is illustrated by the following tests showing the elapsed cooling time from a 100% input setting to two selected settings of lower input rating.

|  | Cooling Time in Seconds | |
| --- | --- | --- |
|  | 6% Input | 15% Input |
| Switch of the prior art | 195 | 111 |
| Switch of the invention | 53 | 10 |

Alternates and modifications will occur to ones skilled in the art, and all such alternatives within the scope of the claims are intended to be within the scope and spirit of the present invention.

I claim:

1. A wattage controller comprising a thermally responsive cycling switch having a pair of contacts arranged to be connected in series with a heating unit, manually operable means for urging one of said contacts into the other contact with controllable resilient displacement of both contacts to adjust the power input to said heating unit by varying the ratio of closed to open time, thermomotive means for opening said contacts, a resistance heater thermally associated with said thermomotive means connected in circuit through said contacts to a power supply comprising the sole effective means for heating said thermomotive means, and means for progressively varying the heat effect of said resistance heater upon said thermomotive means as the power input is adjusted.

2. The controller of claim 1, in which the heat effect of said resistance heater progressively increases as lower power inputs are progressively selected throughout the lower portion of the input range, whereby the lowest inputs can be obtained while still providing a substantial displacement of one contact by the other.

3. A wattage controller comprising a switch having first and second contacts arranged to open and close to regulate by the ratio of closed to open time the average power input to a heating unit, a bimetal associated with the first contact so arranged that it tends to open the contacts when heated, a resistance heater in heat-transfer relationship with said bimetal connected in circuit through said contacts to a power supply comprising the sole effective means for heating said thermomotive means, manually operable means for urging one contact into the other contact with controllable resilient displacement of both contacts, and means for synchronously varying the heat effect of said resistance heater upon said bimetal in such manner as to tend to equalize the time between one contact closure and the next succeeding contact closure throughout a range of power inputs in which the ratio of closed to open contact time is varied.

4. A wattage controller comprising a switch having first and second contacts arranged to open and close to regulate by the ratio of closed to open time the average power input to a heating unit, a bimetal associated with the first contact so arranged that it tends to open the contacts when heated, a resistance heater in heat-transfer relationship with said bimetal connected in circuit through said contacts to a power supply, means for urging one contact into the other contact with controllable resilient displacement, means for synchronously varying the heat effect of said resistance heater upon said bimetal in such manner as to tend to equalize the time between one contact closure and the next succeeding contact closure throughout a range of power inputs in which the ratio of closed to open contact time is varied, and a second resistance heater having a fixed instantaneous heat effect upon said bimetal.

5. The controller of claim 4 in which said second resistance heater is arranged in series with the heating unit.

6. The controller of claim 4 and having a second resistance heater having a fixed instantaneous heat effect upon said bimetal and in which said means for synchronously varying the heat effect of said resistance heater upon said bimetal comprises a variable current limiting resistor connected in circuit with said resistance heater and arranged to progressively increase the heat effect of the first resistance heater as lower ratios of closed to open contact time are progressively selected through the lower portion of the input range.

7. A wattage controller comprising a switch having first and second contacts arranged to open and close to regulate by the ratio of closed to open time the average power input to a heating unit, a bimetal associated with the first contact so arranged that it tends to open the contacts when heated, a resistance heater in heat-transfer relationship with said bimetal connected in circuit through said contacts to a power supply, electrical bypass means around said resistance heater, and common means for adjustably resiliently urging one contact into the other contact and for adjusting the percentage of time that said bypass means is in circuit.

8. The controller of claim 7 in which the percentage of time the bypass means is in circuit is progressively decreased as lower inputs are progressively selected throughout the lower portion of the input range.

9. A wattage controller arranged to regulate by the ratio of closed to open contact time the average power input to a heating unit, having first and second cycling switches each switch including a bimetal arranged to open the switch contacts when heated, adjustable means to resiliently overclose the contacts of at least one of the switches to vary the ratio of on to off time, and resistance heating means thermally associated with each bimetal, each resistance heating means being connected in circuit through the contacts of its associated switch, said one switch regulating by the ratio of closed to open contact time the average power input to a heating unit and said second switch controlling the energization of the resistance heating means of said first switch.

10. The controller of claim 9, in which said second switch is in a bypass circuit around the resistance heating means of said first switch.

11. The controller of claim 10, including means for synchronously varying the displacement of the contacts of said first and second switches respectively.

12. A wattage controller comprising a first switch including a pair of contacts arranged to open and close to regulate by the ratio of closed to open contact time the average power input to a heating unit, a first bimetal associated with one of said contacts so arranged that it tends to open the contacts when heated, a resistance heater in heat-transfer relationship with said bimetal connected in circuit through said contacts to a power supply, a second switch including a pair of contacts arranged in shunt circuit around said resistance heater, a second bimetal associated with one contact of said second switch arranged to open the contacts when heated, resistance heating means for said second bimetal connected through the contacts of said second switch to a power supply, and means for synchronously adjusting the resilient contact displacement of both switches.

13. The controller of claim 12, in which the means for adjusting the contact displacement of both switches is a common means including a cam.

14. The controller of claim 12, in which one contact of each of said switches is supported by said first bimetal, and the adjustment of the contact displacement of both switches is provided by urging the other contact of said first switch into the contact of said first switch that is supported by the bimetal.

15. A wattage controller comprising a switch having a pair of contacts arranged to open and close to regulate by the ratio of closed to open time the average power input to a heating unit, a thermomotive member associated with one of said contacts so arranged that it tends to open the contacts when heated, a resistance heater in heat-transfer relationship with said thermomotive means connected in circuit through said contacts to a power supply comprising the sole effective means for heating said thermomotive means, manually operable adjustment means for urging one of said contacts against the other of said contacts with controllable resilient displacement of both contacts, manually operable adjustment means for varying the heat effect of said resistance heater upon said thermomotive member, and a common manual control for both said adjustment means.

16. A wattage controller comprising a switch having first and second contacts arranged to open and close to regulate by the ratio of closed to open time the average power input to a heating unit, resiliently deflectable means for supporting said contacts including bimetal means associated with said contacts and so arranged as to open said contacts when heated, manually operable contact positioning means for closing said contacts and for variably displacing said contacts in the closed portion by resilient deflection, heating means associated with said bimetal means to open said contacts after closure by said contact positioning means, and means for synchronously varying the heat effect of said heating means on said bimetal means during closing and variable displacement of said contacts by actuation of said contact positioning means in such a manner as to tend to increase the heat effect of said heating means on said bimetal means as the wattage input to the heating unit is decreased.

17. A wattage controller comprising a switch having first and second contacts arranged to be selectively positioned in a plurality of closed positions and to thereafter open and close to regulate by the ratio of closed to open time the average power input to a heating unit, resiliently deflectable means supporting said contacts including bimetal means associated with said contacts and so arranged as to cause movement of said contacts towards an open position when heated, manually operable contact positioning means for moving said contacts to an initially closed position and for variably positioning said contacts in the closed position throughout a range of progressively increased resiliently deflected positions beyond the initially closed position, a first heating means having a fixed instantaneous heat effect upon said bimetal means when said contacts are closed tending to open said contacts, and a second heating means having a variable instantaneous heat effect upon said bimetal means when said contacts are closed tending to open said contacts, the heat effect of said second heating means being variable in accordance with the variable positioning of said contacts effected by said manually operable contact positioning means.

18. In an infinite switch for controlling an electric heating load such as the surface heating unit of an electric range or the like having a pair of contacts movable between open and closed positions, selector means to select varying heat inputs for said electric heating load, actuating means operable by said selector means to adjustably variably resiliently displace one contact by engagement with the other contact in the closed position, heater means connected in series with the contacts, thermomotive means mounted in heat transfer relation to said heater means and arranged to open the contacts in response to heat derived solely from said heater means generated when said contacts are closed, the improvement comprising means for modifying the instantaneous heating effect of the heater means on the thermomotive member per unit of time of contact closure as the on-off cycle time is varied by increasing the current flow through the heater means as the time during which the heater means is energized decreases.

19. In a switch for controlling an electric heating load such as a surface heating unit of an electric range or the like comprising spring strip means, means fixedly supporting a portion of said spring strip means, first contact means mounted on another portion of said spring strip means for resilient deflection therewith, bimetal compensating means connected to said spring strip means and adapted to cause deflection of said spring strip means and said first contact means in a first direction when subjected to temperature changes, cam follower means provided on said bimetal compensating means, cam means engageable with said cam follower means, manually operable adjustment means connected to said cam means to cause movement of said cam means resulting in deflection of said bimetal compensating means and said spring strip means and said contact means, bimetallic means, means fixedly supporting one end of said bimetallic means and supporting said bimetallic means adjacent said spring strip means and said first contact means and being oriented to cause movement of said bimetallic means away from said first contact means when heated, a second contact means mounted on said bimetallic means for resilient deflection therewith and engagement with said first contact means and deflection during engagement with said first contact means under the influence of pressure exerted by said cam means through said bimetal compensating means, first resistance heater means mounted in heat transfer relation to said bimetallic means and being energized during engagement of said first contact means and said second contact means and effective when energized to move said second contact means away from said first contact means to tend to open contacts, a second resistance heater means mounted in heat transfer relationship with said bimetallic means and being energized during engagement of said first contact means and said second contact means and effective when energized to move said second contact means away from said first contact means to tend to open the contacts, potentiometer means connected in circuit with one of the resistance heater means and being adjustable to provide variable resistances in said circuit to vary the current flow through said one of the resistance heater means, actuating means for said potentiometer means, and means connecting said actuating means to said manually operable adjustment means to effect simultaneous adjustment of said cam means and said actuating means resulting in changes in the heating effect of the one of the resistance heater means on the bimetallic means simultaneously with changes in deflection of said spring strip means and location of said first contact means relative to said bimetallic means and said second contact means.

20. The invention as defined in claim 19 and wherein the cam means and the potentiometer means have a relationship effecting maximum current flow to one of the resistance heater means at minimum deflection of said spring strip means.

21. The invention as defined in claim 20 and wherein the relationship between the cam means and the potentiometer means effects a progressive decrease in current flow to the one of the resistance heater means as the deflection of the spring strip is increased.

22. A switch having infinite settings for controlling power input to a heating element of a stove or the like comprising bimetallic means resiliently movable under the effects of temperature changes, a first contact mounted on and movable with said bimetallic means, resilient contact support means, a second contact mounted on and movable with said resilient contact support means and engageable with said first contact, heater means to heat said bimetallic means when said contacts are closed, a second bimetallic means, a third contact mounted on said second bimetallic means, a fourth contact mounted for engagement with said third contact, circuit means connecting said third and fourth contact and said second bimetallic means in parallel with said first and second contacts and said first bimetallic means, and means to heat said second bimetallic means when said first and second contacts are closed to effect opening of said third and fourth contacts to vary the heat output of said heater means in accordance with the setting of said switch, the ratio of open to closed time of said third and fourth contacts varying inversely to the ratio of open to closed time of said first and said second contacts.

23. The invention as defined in claim 22 and said second bimetallic means being mounted on said first bimetallic means and movable therewith, and said fourth contact being fixed relative to said second bimetallic means and said first bimetallic means and located to increase engagement between said third and fourth contacts as said first bimetallic means is moved toward the contact opening position relative to said first and second contacts.

24. An energy regulator for a heating unit of a stove or the like operable through a range of power input including high power input and low power input comprising a switch having a pair of contacts arranged to open and close to regulate by the ratio of closed to open time the average power input to the heating unit, a thermally responsive member controlling the condition of said contacts so arranged as to tend to open the contacts when heated, manually operable regulating means for closing said contacts and for moving said contacts in the closed condition with controllable resilient displacement to vary the average power input to the heating unit by varying the ratio of closed to open contact time, heater means in heat transfer relationship with said thermally responsive member connected in circuit through said contacts in the closed condition to a power supply and providing the only temperature changes in said thermally responsive member effective to change the condition of said contacts, and means for progressively increasing the amount of heat transferred to said thermally responsive member from said heater means as the average power input to the heating unit is reduced to improve regulator accuracy in the lower input range and to increase uniformity of open-closed contact cycle lengths in the lower power input settings.

25. An energy regulator for a heating unit for a stove or the like operable through a range of power input to the heating unit including high power input and low power input comprising a switch having a pair of contacts arranged to open and close to regulate by the ratio of closed to open time the average power input to the heating unit, resilient thermally responsive means movably supporting one of said contacts and controlling the condition of said contacts so arranged as to tend to open the contacts when heated, manually operable regulating means for closing said contacts to energize the heating unit by movement of one of said contacts relative to the other contact from a normally open position spaced from the other contact to a closed position of resilient engagement with the other contact and for engaging said contacts throughout a range of variably resiliently engaged positions between a position of minimum resilient engagement and a position of maximum resilient engagement to vary the average power input to the heating unit by varying the ratio of closed to open contact time, heater means in heat transfer relationship with said thermally responsive means connected in circuit through said contacts in the closed condition to a power supply, said heater means providing the only temperature changes in said thermally responsive means effect to change the condition of said contacts, heater control means for adjusting the heating effect of said heater means on said thermally responsive means throughout the range of variably resiliently engaged positions, said heater control means providing a range of selectable variable heating effects between a maximum heating effect and a minimum heating effect, selection means for said heater control means operably associated with said manually operable regulating means for selectively adjusting the heating effect of said heating means throughout the range of heating effects, said heater control means providing a maximum heating effect in said position of minimum resilient engagement of said contacts and a minimum heating effect in said position of maximum resilient engagement of said contacts and providing decreasing heating effects as the resilient engagement of said contacts is increased from said position of minimum resilient engagement to said position of maximum resilient engagement whereby the amount of heat transferred to said thermally responsive means from said heater means is progressively increased as the average power input to the heating unit is reduced thereby improving regulator accuracy in the lower power input range and increasing uniformity of open-closed contact cycle lengths in the lower power input range.

26. A wattage controller for controlling power input to a load comprising a pair of mateable contacts effective when closed to connect said load to an energy source and arranged to regulate by the ratio of closed to open time the average power input to the load, first and second resiliently deflectable contact support means, one of said contacts being mounted on and movable with one of said support means and the other of said contacts being mounted on and movable with the other of said support means, mounting means for said contact supports normally locating said contacts in aligned spaced relationship in an open condition, actuating means engageable with one of said contact supports and having a plurality of variable positions of engagement with said one of said contact supports, said one of said contact supports being engageable by said actuating means in each of said plurality of variable positions and being variably resiliently deflected toward the other of said contact supports thereby, said one of said contacts being engaged with the other of said contacts in each of a plurality of the variable positions, said contacts being variably positioned in engagement with one another in each of the plurality of the variable positions, said other of said contact supports being variably positioned in each of the plurality of the variable positions as said contacts are variably positioned, bimetal means associated with one of said contact supports and being arranged to move said one of said contact supports away from the other of said contact supports when heated to cause said contacts to open, heater means mounted in heat transfer relationship with said bimetal means, circuit means connecting said heater means to said energy source in series with said contacts for energization of said heater means during closure of the contacts, means to vary the heating effect of said heater means on said bimetal means, and adjustment means for changing the heating effect of said heater means in accordance with location of said contact support means and said contacts in the closed position, said adjustment means being so related to said actuating means as to increase the heating effect of said heater means as the power input to said load decreases and to decrease the heating effect as the power input to said load increases.

References Cited in the file of this patent

UNITED STATES PATENTS

| | | |
|---|---|---|
| 2,611,855 | Turner | Sept. 23, 1952 |
| 2,623,137 | Vogelsberg | Dec. 23, 1952 |
| 2,769,890 | Hallerberg et al. | Nov. 6, 1956 |
| 2,962,575 | Baker | Nov. 29, 1960 |
| 2,971,074 | Strobel et al. | Feb. 7, 1961 |

UNITED STATES PATENT OFFICE
CERTIFICATE OF CORRECTION

Patent No. 3,167,643 January 26, 1965

Charles Roger Turner

It is hereby certified that error appears in the above numbered patent requiring correction and that the said Letters Patent should read as corrected below.

Column 2, line 69, for "in", second occurrence, read -- is --; column 12, line 18, for "mateable" read -- matable --; line 23, for "mouned" read -- mounted --.

Signed and sealed this 20th day of July 1965.

(SEAL)
Attest:

ERNEST W. SWIDER
Attesting Officer

EDWARD J. BRENNER
Commissioner of Patents